(12) United States Patent
Goel

(10) Patent No.: US 6,775,668 B1
(45) Date of Patent: Aug. 10, 2004

(54) METHOD AND SYSTEM FOR ENHANCING QUORUM BASED ACCESS CONTROL TO A DATABASE

(75) Inventor: Purushottam Goel, Bangalore (IN)

(73) Assignee: Novell, Inc., Provo, UT (US)

( * ) Notice: Subject to any disclaimer, the term of this patent is extended or adjusted under 35 U.S.C. 154(b) by 387 days.

(21) Appl. No.: 09/659,127

(22) Filed: Sep. 11, 2000

(51) Int. Cl.⁷ .............................................. G06F 17/30
(52) U.S. Cl. ............................. 707/9; 707/10; 707/104; 707/204
(58) Field of Search ............................. 707/9, 104, 10, 707/516, 204; 713/200, 202, 183; 709/101, 217, 213; 380/21; 705/54

(56) References Cited

U.S. PATENT DOCUMENTS

| | | | | |
|---|---|---|---|---|
| 5,678,041 A | * | 10/1997 | Baker et al. ................... | 707/9 |
| 5,787,169 A | * | 7/1998 | Eldridge et al. ............... | 380/4 |
| 5,864,871 A | * | 1/1999 | Kitain et al. ................. | 707/104 |
| 5,937,066 A | * | 8/1999 | Gennaro et al. .............. | 380/21 |
| 5,940,843 A | * | 8/1999 | Zucknovich et al. ....... | 707/516 |
| 5,978,914 A | * | 11/1999 | Carley et al. ................ | 713/200 |
| 5,987,506 A | * | 11/1999 | Carter et al. ................. | 709/213 |
| 6,085,191 A | * | 7/2000 | Fisher et al. ................... | 707/9 |
| 6,178,508 B1 | * | 1/2001 | Kaufman .................... | 713/183 |
| 6,236,996 B1 | * | 5/2001 | Bapat et al. ................... | 707/9 |
| 6,286,001 B1 | * | 9/2001 | Walker et al. ................. | 707/9 |
| 6,295,536 B1 | * | 9/2001 | Sanne .......................... | 707/10 |
| 6,314,408 B1 | * | 11/2001 | Salas et al. .................... | 705/54 |
| 6,366,915 B1 | * | 4/2002 | Rubert et al. ................. | 707/10 |
| 6,434,607 B1 | * | 8/2002 | Haverstock et al. ........ | 709/217 |
| 6,477,559 B1 | * | 11/2002 | Veluvali et al. ............. | 709/101 |
| 2002/0023232 A1 | * | 2/2002 | Serani et al. ............... | 713/202 |
| 2002/0095415 A1 | * | 7/2002 | Walker et al. ................. | 707/9 |

OTHER PUBLICATIONS

Naor et al., "Access control and signatures via quorum secret sharing", IEEE, 1998, pp. 909–922.*

* cited by examiner

Primary Examiner—Thuy N. Pardo
(74) Attorney, Agent, or Firm—Haynes and Boone, LLP

(57) ABSTRACT

A method and system is provided for implementing a quorum based access control mechanism for modifying at least one database attribute in a database. The database is managed by a network directory service. Upon a request of an initiator, the network directory service establishes one or more quorum attributes for defining the quorum based access control mechanism. The quorum attributes provide one or more authorized users who have rights to participate in a quorum for accepting or rejecting a modification request. When a modifier initiates a modification request, he proposes a value to modify the database attribute. The modification request is granted and the database attribute is changed to the proposed value if a quorum as defined by the quorum attributes is reached.

28 Claims, 5 Drawing Sheets

METHOD AND SYSTEM FOR ENHANCING QUORUM BASED ACCESS CONTROL TO A DATABASE

BACKGROUND OF THE INVENTION

The present invention relates generally to computer software, and more particularly, to a system and method for implementing a quorum based access control mechanism for modifying a database component.

In today's computer network environment, it is common that significant amounts of data are customarily stored and used by various users of a database. Naturally, data management has become an essential task for many data intensive industries. A smooth business operation relies both on the efficiency and security of the database. With the advancement of computer technologies, the size and complexity of a typical database is increasing continuously.

Different users of the database normally have different levels of access rights. From the perspective of data management, a database administrator (DBA) is powerful in that he usually has a full access to the entire database and all data stored therein. He can freely read, write and modify any data stored in the database. In a normal situation, the DBA is endowed with the highest level of trust because of his important responsibilities. Other users may be given different access rights depending on their needs. Some have read access rights only, while others have write access rights. Under certain circumstances, it is desirable to store data in a database in a secure way such that even a privileged user like the DBA should not be able to modify records of the database without being detected or without obtaining consents from some other database managers such as an independent auditor. The role of an independent auditor is to trace any user's, including the DBA's, actions relating to the database, thereby enhancing the integrity and the security of the database.

From the inception of the concept of computer databases, the access control issue of a database focuses on access rights of a single user. The scope of access belonging to a particular user depends exclusively on the access rights granted to him by a superior authority, who may very likely be the DBA. For example, in a normal case, a user who has a write access right to a database attribute can modify that attribute freely. However, those who have only an access right to read the same attribute can not "touch" the attribute.

With the database security problem becoming an increasingly complex and sensitive issue for operation on a daily basis, there is a growing need to support quorum based modifications in a database. There are situations when not a single user can be trusted to take actions alone in the database, and such situations warrant the need of a quorum based access control mechanism. In these situations, a minimum of two authorized users must together initiate a change to the database, and the number of the users required can be changed by a superior user of the database depending on the need of a particular case.

For instance, a network audit configuration is stored in a Novell proprietary Network Directory Service (the "NDS") in the form of Audit Policy objects. The access control to these objects is managed by the NDS. In a typical scenario, there are at least two high-level trusted users involved, e.g., a DBA (or a system administrator of the same capacity) and a "top level auditor." Unfortunately, neither of them trusts, or should trust, the other. Hence, any one of them is denied access to modify the network audit configuration (e.g., the audit policies) single-handedly. The check-and-balance relationship between the DBA and the auditor helps to enhance the database security, but nevertheless hinders some of the database operations. There are situations when any of them needs an access to the audit policy objects. For instance, some changes in the organization's security policies may need to be modified. However, it is not desirable that any one of them should be able to modify the audit policy objects or even modify an Access Control List (which enables him to modify the objects) without the knowledge of the other. A clear consent of both the DBA and the auditor is required for the modification to occur.

What is needed is an efficient method for implementing a quorum based access control mechanism for modifying a database.

SUMMARY OF THE INVENTION

A method and system is provided for implementing a quorum based access control mechanism for modifying at least one value of a database component ("Database Attribute"). In a typical example, the database is managed by a network directory service. Upon a request of an initiator who has a special right, the network directory service establishes one or more quorum attributes for defining the quorum based access control mechanism.

Once the quorum attributes are established, the quorum attributes provide one or more authorized users who have rights to participate in a quorum for accepting or rejecting a modification request. According to one example, various quorum attributes clearly define the access control mechanism. For instance, a Modified Attribute Value is for temporarily storing a proposed value for modifying the Database Attribute. A List of Owners indicates a list of authorized users who have rights to consider the Modified Attribute Value. A Quorum Size attribute defines a minimum number of authorized users to form a quorum to accept the Modified Attribute Value. A time period is also provided by the quorum attribute to require the modification request to be considered within a predetermined time frame. A Mandatory Authorizers attribute provides a list of authorized users whose participation in the quorum are mandatory for modifying the Database Attribute with the Modified Attribute Value. The Mandatory Authorizers is a sub group of the List of Owners. Moreover, an Authorization Status Table records identities and actions taken by the authorized users in the List of Owners.

When a modifier initiates a modification request, he proposes a value to modify the Database Attribute. The modification request is granted and the Database Attribute is changed to the proposed value if a quorum, as defined by the quorum attributes, is reached and all of the Mandatory Authorizers have accepted the proposed value within the predetermined time frame.

DESCRIPTION OF THE PREFERRED EMBODIMENT

Figure 1:
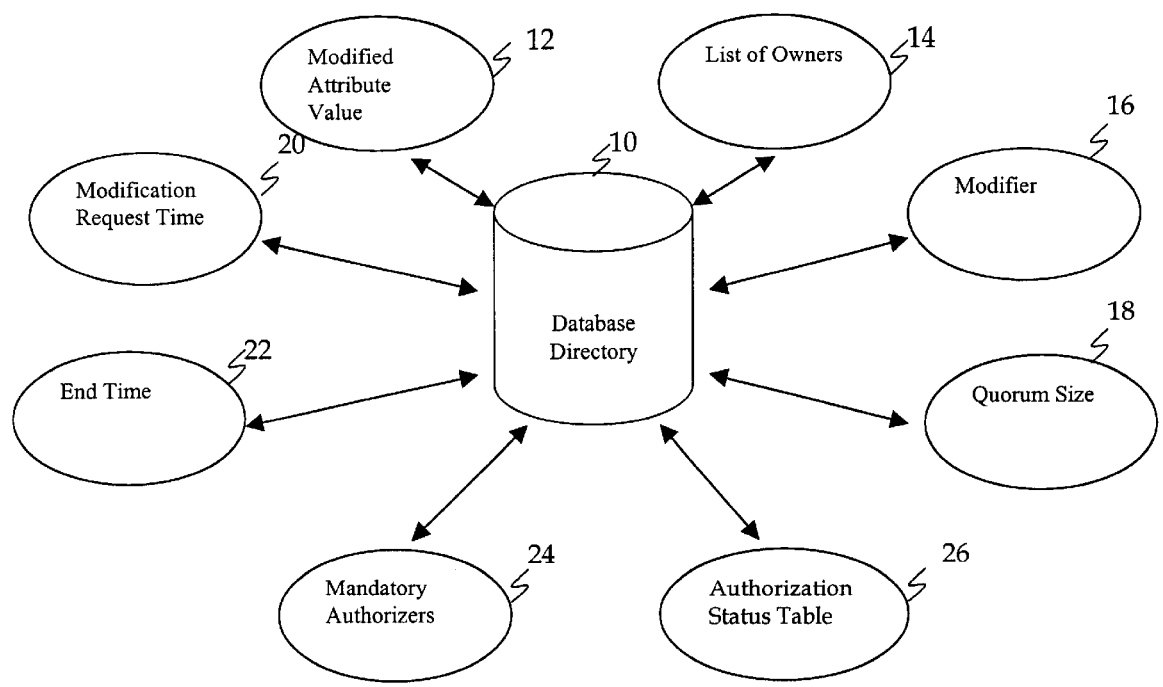
FIG. 1 illustrates a directory schema designed to support a quorum based access control mechanism according to one example of the present invention.

Referring now to FIG. 1, a directory schema 10 designed to implement a quorum based access control mechanism is shown according to one example of the present invention. A database, or any component of the database such as a database directory, is provided and defined with a series of attributes ("quorum attributes"). Since the database component is subjected to modifications by one or more authorized users or owners simultaneously (or "quorum based modifications"), the quorum attributes in aggregate define access rights of the users. In one example, the quorum attributes include Modified Attribute Value 12, List of Owners 14, Modifier 16, Quorum Size 18, Modification Request Time 20, End Time 22, Mandatory Authorizers 24, and Authorization Status Table 26. Details for defining these attributes are explained further below.

Modified Attribute Value

This quorum attribute should be able to hold a suggested or proposed value for a database component whose access has to be controlled by a quorum. That is, a minimum number of the authorized users must all agree to the proposed value before the value of the database component ("Database Attribute") can actually be changed. This quorum attribute thus serves the purpose of a "buffer" parameter that can be modified without changing the original or actual value of the database component. Only when a legitimate quorum has been obtained to accept a proposed value, then the Database Attribute will be replaced.

List of Owners

This is a set of authorized users or owners of the Database Attribute among whom a quorum is necessary for modifying the Database Attribute. In terms of computer language for databases, this quorum attribute can be of a type FDN[ ] containing multiple parameters of Fully Distinguished Name (FDN) type.

Modifier

This quorum attribute lists an authorized user or owner who initially suggests the modification of the Database Attribute. It may also be of a FDN type. If one is included in the List of Owners, he can be a Modifier at any time.

Modification Request Time

This quorum attribute records the time at which an initial modification request is made by the modifier.

End Time

This quorum attribute defines a time deadline by which other authorized users and owners in the List of Owners must respond to effect the modification. If a quorum is not reached by this time, the database (or the NDS) resets all relevant fields and no change of the Database Attribute will take place.

Mandatory Authorizers

This quorum attribute is a subset of the List of Owners whose authorizations are mandatory for the modification of the Database Attribute to occur. Absent an approval from any one of the mandatory authorizers, any attempt to modify the Database Attribute will fail. Hence, each of these users or owners listed has a "veto power" to prohibit any proposed changes. If this quorum attribute is set to be empty, the proposed modification is to be effected after a minimum number of approvals among any of the owners in the List of Owners (or a quorum) are cast (or a quorum is reached).

Quorum Size

This quorum attribute defines the size of a quorum required. It provides a minimum number of authorizations or approvals required among the authorized users or owners in the List of Owners to effect a suggested modification. This number must be greater than (or equal to) the size of the list of Mandatory Authorizers.

Authorization Status Table

This table contains the status of authorizations given by various authorized users or owners between the Modification Request Time and End Time. The Authorization Status Table is a composite attribute and can be represented, as an example, using the following computer codes in C language:

```
AuthorizationStatusTable[ ]
where authorizationStatusTable is:
typedef struct authorizationStatusTableStruct
{
    FDN    fdn;
    int    authorizationValue;
}authorizationStatusTable;
``` wherein the "fdn" in the above code is the FDN of the owner who has authorized the modification and the "authorization Value" is a boolean attribute indicating acceptance (TRUE) or rejection (FALSE) of the corresponding owner.

When the owner requests a modification of a Database Attribute, he is now identified as the modifier, and the fdn field of the authorization Status Table is populated with the modifier's fdn and the authorization Value is set to TRUE. As and when other authorized owners or users accept or reject the modification request, corresponding information is recorded in the table.

There are certain inherent constraints of the quorum attributes, which are shared by all the quorum attributes, that define their relations among them. For example, the modifier must be one user listed in the List of Owners, the End Time is always greater than the Modification Request Time. Users listed in the Mandatory Authorizers must be included in the List of Owners, and the size of the Mandatory Authorizers is smaller than or equal to the Quorum Size. In addition, none of the authorized user has a right to write directly to the original Database Attribute, but each has read/write access rights on the Modified Attribute Value to begin with. Once a modifier has placed a request for modification, the write access right on the Modified Attribute Value granted to all other co-owners in the List of Owners are revoked till either the modification is effected, or rejected, or the modification request expires at the End Time. It is further understood that a Database Attribute can be a single attribute of a database component, a group of attributes of a database component, or a database component itself, or any other equivalents.

Figure 2:
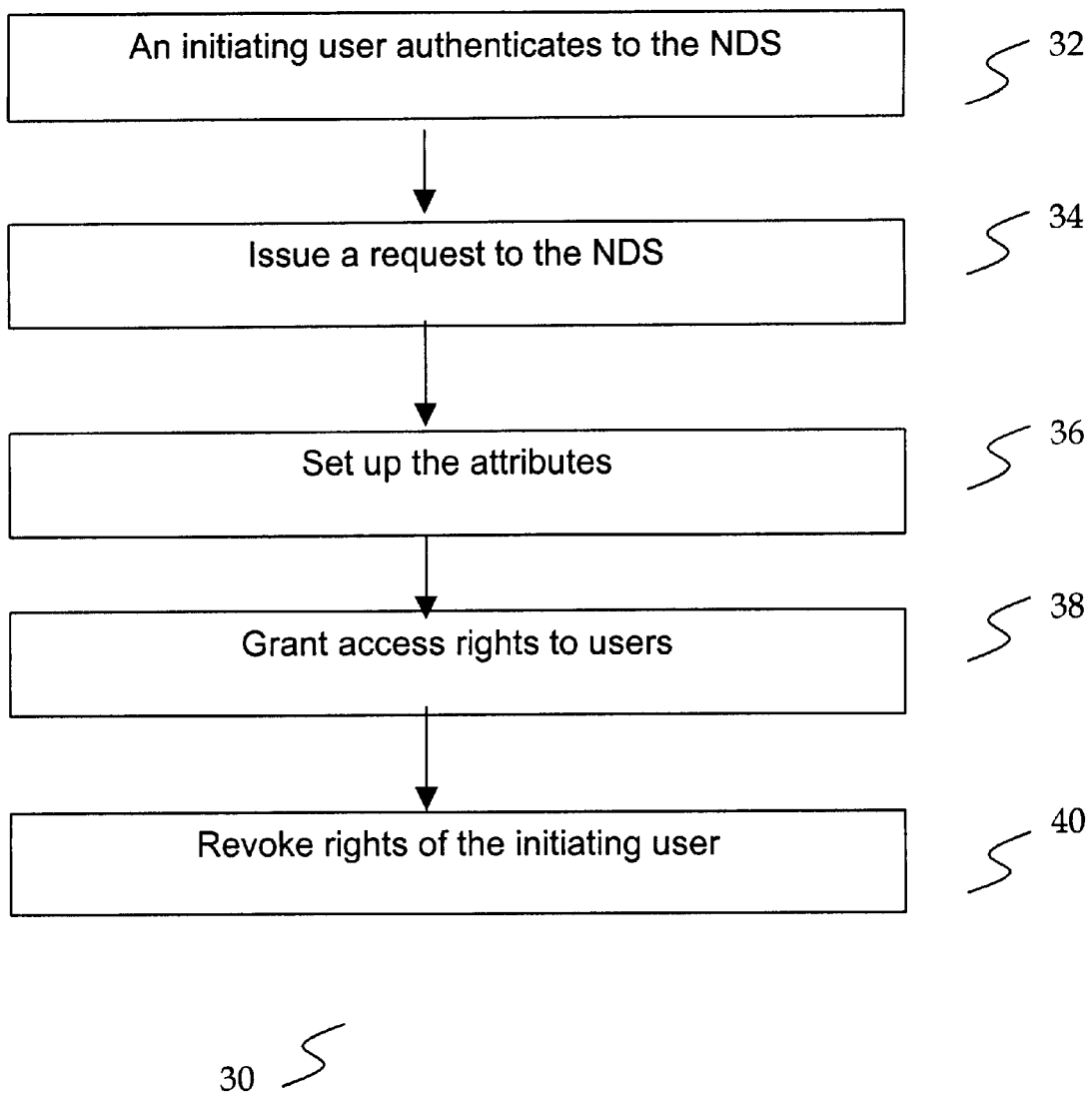
FIG. 2 is a flow diagram illustrating key processes for a user having a special access right to the directory schema to set up a quorum based access control mechanism for modifying a database component.

Referring now to FIG. 2, a flow diagram 30 illustrates key processes for a user having a special access right to the directory schema to set up a quorum based access control mechanism for modifying a Database Attribute. In step 32, a user having a special access to the Database Attribute (e.g., one who has a Supervisory right) authenticates to the Network Directory Service (NDS). The Supervisory right is a temporary right granted to a special user solely for the purpose of establishing the quorum based access control mechanism. Many standards or mechanisms can be established to determine who should have the Supervisory right and when he should have it. The user having the Supervisory right is deemed as an initiator who then issues a request to the NDS in step 34. In one example of the present invention, the request typically contains the following information:

List of Owners

List of Mandatory Authorizers, if any; and

Quorum Size, i.e. minimum authorizations of the owners required.

After receiving the request from the initiator, in step 36, the NDS creates all relevant quorum attributes such as those shown and described according to FIG. 1. The values of these quorum attributes are populated if possible in conformance with the content of the request sent by the initiator. Further in step 38, the NDS grants read access right to all owners to the Database Attribute. The NDS also grants read/write access rights to all owners to at least two attributes, e.g., the Modified Attribute Value attribute and End Time. This allows any member of the List of Owners to propose a change of the Database Attribute. Once appropriate access rights have been granted to the members of the List of Owners, the Supervisory right of the initiator is revoked in step 40. The write access rights of the initiator as to the Database Attribute, List of Owners, List of Mandatory Authorizers and Quorum Size are subsequently revoked. Consequently, none of the authorized users or owners is granted with the write access right to the Database Attribute. This assures that no one can change the Database Attribute without going through the quorum based access control mechanism. With the above described initiation processes, any proposed change to the Database Attribute will be examined and is subject to a quorum approval.

Figure 3:
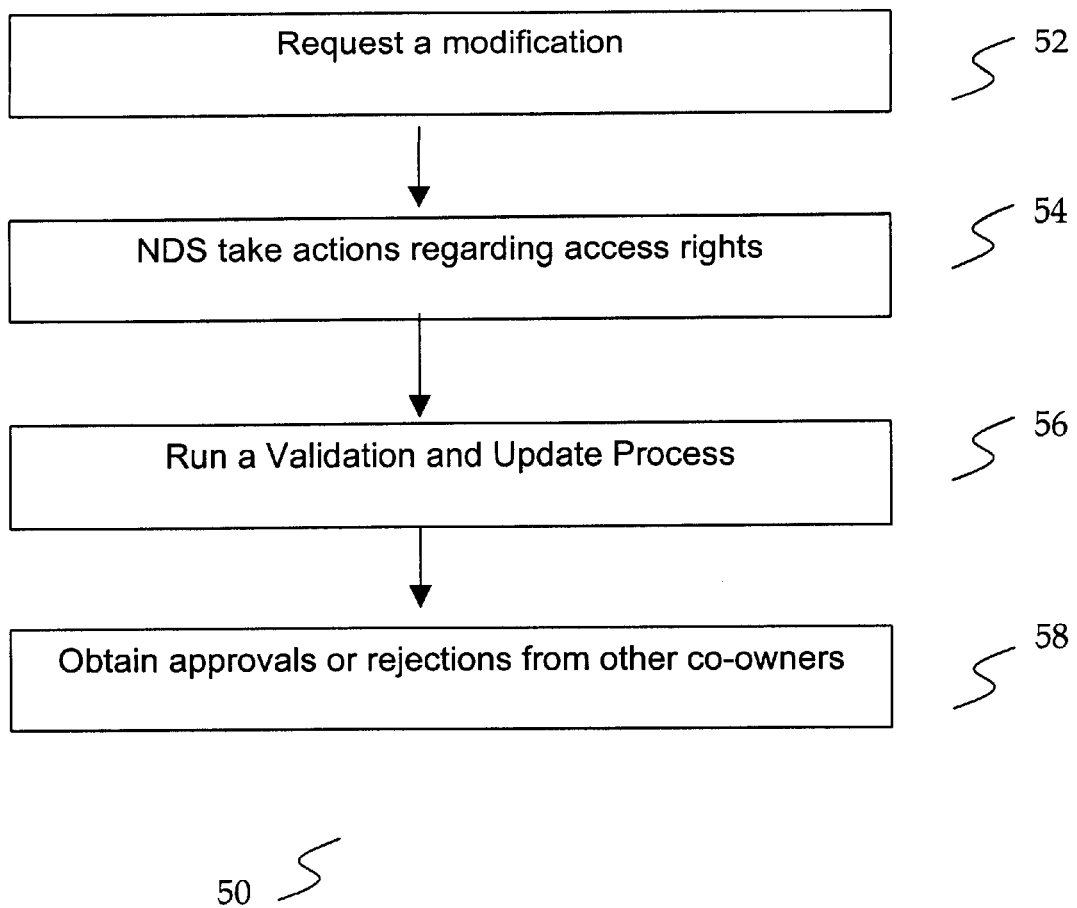
FIG. 3 is a flow diagram illustrating processes for any authorized user or owner to propose a modification of a database component according to one example of the present invention.

Referring now to FIG. 3, a flow diagram 50 illustrates processes for any authorized user or owner to propose a modification of a Database Attribute after the quorum based access control mechanism is established. A member of the List of Owners who desires to issue a Modification Request ("modifier") must first authenticate to the NDS in step 52. He requests the modification of the Database Attribute by providing at least the following information to the NDS:

Proposed new value of the Database Attribute; and

End Time.

This can be done by sending a database message to the NDS. In order to process one proposed value at a time, in step 54, the NDS updates the value of the Modified Attribute Value and End Time, and then revokes the write access rights of all other co-owners to these two quorum attributes. The NDS also updates the Authorization Status Table to indicate the Modifier and his acceptance (i.e. inserting a value of TRUE to the corresponding parameter). The NDS populates the "Modification Request Time" attribute with the current time. In step 56, the NDS start to conduct a Validation and Update Process (described below later). The NDS registers the End Time with a scheduler which may be an external timer process for the database. In case the End Time is reached, the scheduler will terminate NDS's Validation and Update Process, and subsequently resets the Modification Request. In step 58, the modifier notifies all the owners about the modification request and solicits their approvals.

Figure 4:
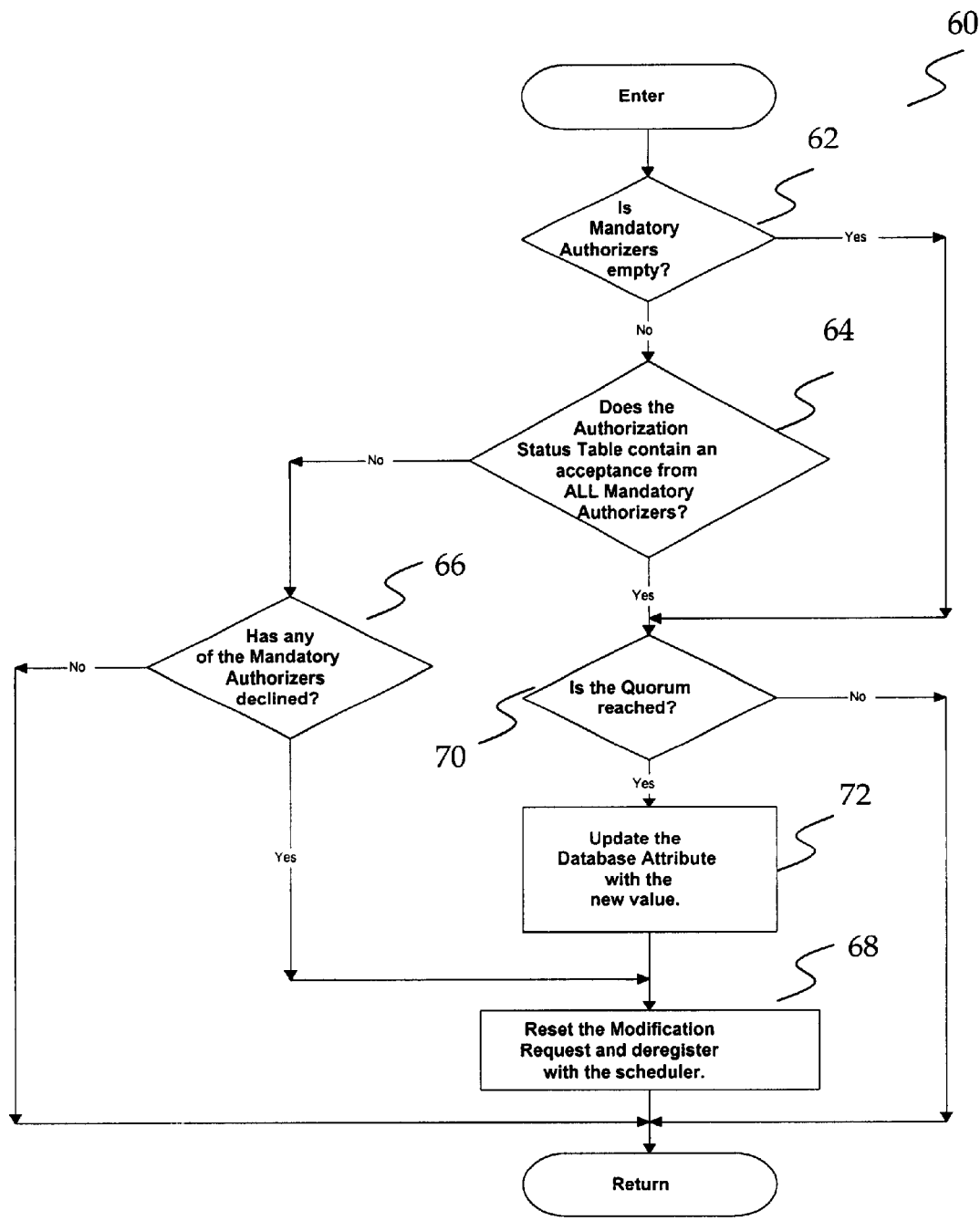
FIG. 4 is a flow diagram illustrating a Validation and Update Process shown in FIG. 3 conducted by a Network Directory Service.

FIG. 4 is a flow diagram 60 illustrating the Validation and Update Process (step 56 in FIG. 3) conducted by the NDS according to one example of the present invention. After the Validation and Update Process is invoked, the Mandatory Authorizers attribute is checked in step 62 to determine whether it is empty or not. If it is empty, there is no owner who has a veto power to this particular Database Attribute. If the Mandatory Authorizers is not empty, then the Authorizer Status Table may need to be checked in step 64 to see whether all the mandatory authorizers have given their acceptances to the proposed value of the Database Attribute.

In the case where not all of the acceptances are given, step 66 determines whether any of the mandatory authorizers has declined to take position in the proposed change. If there is at least one mandatory authorizer who has declined, it is clear that he has exercised the veto power, and step 68 is conducted to reset the modification request and de-register the external scheduler. That is, the attempt to modify the Database Attribute is denied. Another outcome of step 64 is that all of the mandatory authorizers have given their acceptances. If so, step 70 decides whether a legitimate quorum has been reached. Only when a quorum has successfully been reached, the Database Attribute is permitted to change to the proposed value in step 72. After the value of the Database Attribute has been changed, step 68 is performed as well to conclude that a new value of the Database Attribute has been established and the modification request should be terminated.

After a modifier proposes a new value for the Database Attribute, in order to accept or reject a proposed modification request, an owner (or, more precisely, a co-owner) in the List of Owners first authenticates to the NDS. He then issues a message to the NDS indicating his acceptance or declination to the modification request. The NDS then updates the Authorization Status Table with information about the modifier and the parameter value indicating his acceptance (e.g., TRUE), or declination (e.g., FALSE).

Figure 5:
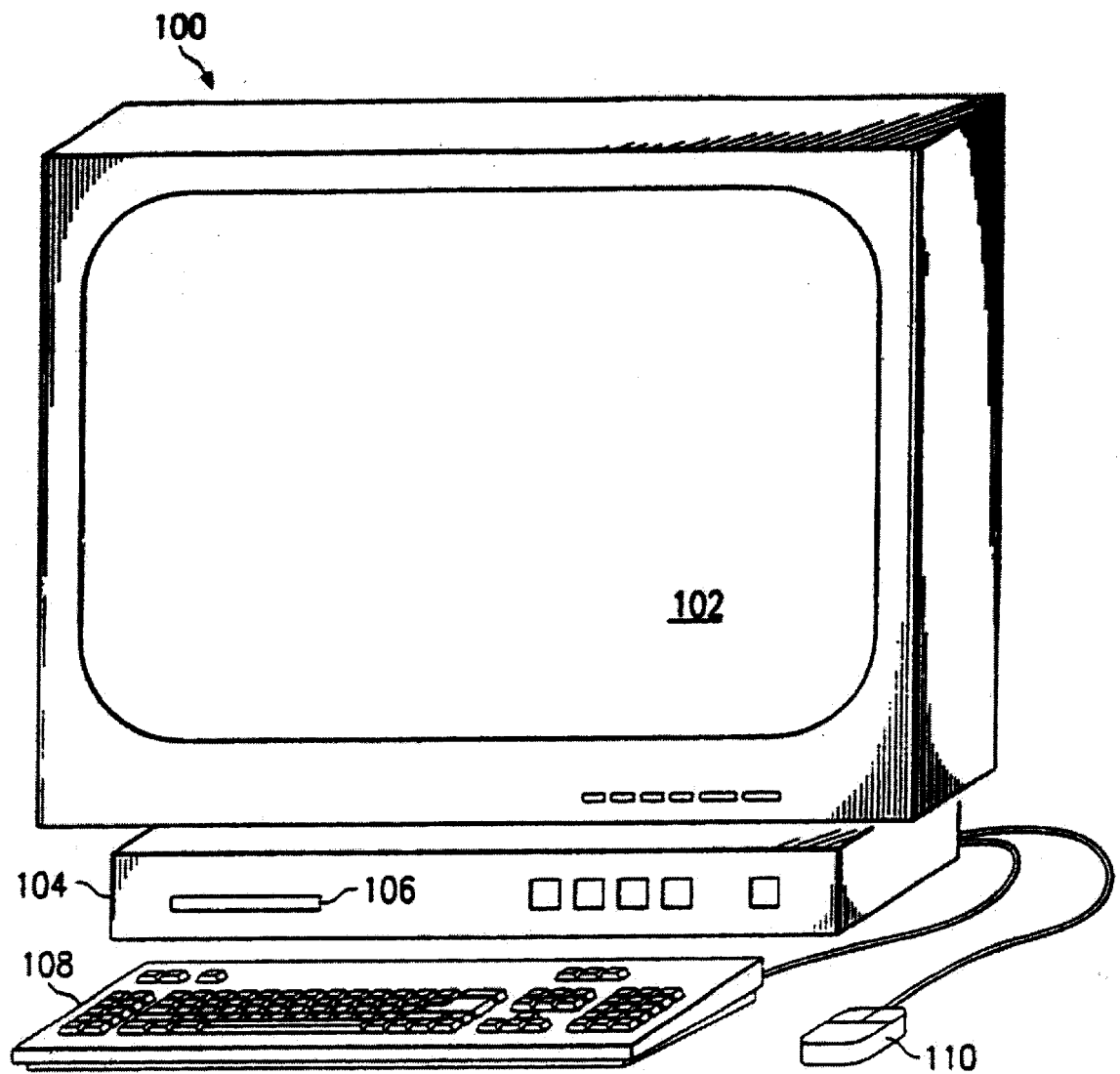
FIG. 5 illustrates a computer system for implementing the present invention.

It will also be understood by those having skill in the art that one or more (including all) of the elements/steps of the present invention may be implemented using software executed on a general purpose computer system or networked computer systems, using special purpose hardware-based computer systems, or using combinations of special purpose hardware and software. Referring now to FIG. 5, for the sake of example, a typical computer system 100 includes a two-dimensional graphical display (also referred to as a "screen") 102 and a central processing unit 104. The central processing unit 104 contains a microprocessor and random access memory for storing programs. A disk drive 106 for loading programs may also be provided. A keyboard 108 having a plurality of keys thereon is connected to the central processing unit 104, and a pointing device such as a mouse 110 is also connected to the central processing unit 104.

The above disclosure provides many different embodiments, or examples, for implementing different features of the invention. Specific examples of components, and processes are described to help clarify the invention. These are, of course, merely examples, and are not intended to limit the invention from that described in the claims.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for implementing a quorum based access control mechanism for modifying at least one database attribute in a database, wherein the quorum based access control mechanism requires an authorized user's proposed value for the database attribute to be accepted by at least one other authorized user before the database attribute is changed, the database being managed by a network directory service (NDS), the method comprising:

establishing one or more quorum attributes by an initiator for defining the quorum based access control mechanism;

initiating a modification request by a modifier to propose a value for the database attribute, wherein the modifier is an authorized user;

receiving an approval or rejection of the proposed value from at least one authorized user other than the modifier;

determining if the received approval results in a quorum, wherein the quorum exists only when a redefined minimum number of authorized users approve the proposed value; and changing the database attribute by the proposed value only if a quorum is reached, wherein the quorum attributes provide the proposed value for the database attribute, an identification of one or more authorized users who have rights to participate in the quorum for accepting or rejecting the proposed value, and the minimum number of authorized users needed to form the quorum.

2. The method of claim 1 wherein the quorum attributes further provide a time period in which the proposed value is to be considered by the authorized users.

3. The met hod of claim 1 wherein the quorum attributes further provide a list of authorized users whose participation in the quorum are mandatory for modifying the database attribute with the proposed value.

4. The method of claim 3 wherein the database attribute is not to be modified if at least one authorized user whose participation in the quorum is mandatory does not participate in the quorum.

5. The method of claim 1 wherein the step of establishing further includes:

granting a read access right to all the authorized users to the database attribute;

granting a right to all the authorized users to request a modification of the database attribute.

6. The method of claim 1 wherein the proposed value is stored in a quorum attribute readable by all the authorized users.

7. The method of claim 1 wherein the step of initiating further includes sending the modification request in a database message from the modifier to the NDS.

8. A computer program for implementing a quorum based access control mechanism for modifying at least one database attribute in a database, the database being managed by a network directory service (NDS), the computer program comprising:

one or more quorum attributes established by the NDS upon the request of an initiator for defining the quorum based access control mechanism;

means for initiating a modification request by a modifier to propose a value for the database attribute;

means for receiving a response to the proposed value from at least one authorized user other than the modifier;

means for determining if the received response results in a quorum, wherein the quorum exists only when a predefined minimum number of authorized users submit a response approving the proposed value; and means for changing the database attribute by the proposed value only if a quorum is reached, wherein the quorum attributes provide the proposed value for the database attribute, one or more authorized users who have rights to participate in a quorum for accepting or rejecting the proposed value, and a minimum number of authorized users to form the quorum.

9. The computer program of claim 8 wherein the quorum attributes further provide a time period in which the proposed value is to be considered by the authorized users.

10. The computer program of claim 8 wherein the quorum attributes further provide a list of authorized users whose participation in the quorum are mandatory for modifying the database attribute with the proposed value.

11. The computer program of claim 10 wherein the database attribute is not to be modified if at least one authorized user whose participation in the quorum is mandatory does not participate in the quorum.

12. The method of claim 8, when the quorum attributes are established by the NDS, further comprising:

granting a read access right to all the authorized users to the database attribute; granting a right to all the authorized users to request a modification of the database attribute.

13. The method of claim 8 wherein the proposed value is stored in a quorum attribute readable by all the authorized users.

14. The method of claim 1 wherein the step of initiating further includes sending the modification request in a database message from the modifier to the NDS.

15. A computer database having a quorum based access control mechanism for modifying at least one database attribute, the computer database being managed by a network directory service (NDS), the computer database comprising:

a modified attribute value attribute for temporarily storing a proposed value for modifying the database attribute;

a list of owners attribute indicating a first list of authorized users to consider the modified attribute value;

a quorum size attribute defining a minimum number of authorized users to form a quorum to accept the modified attribute value;

a modification request time recording a first time stamp when the modified attribute value is initially provided by a modifier;

an end time attribute indicating a second time stamp beyond which the modified attribute value is not considered by the authorized users in the list of owners;

a mandatory authorizers attribute providing a second list of authorized users whose participation in the quorum are mandatory for modifying the database attribute with the modified attribute value; and an authorization status table recording identities and actions taken by the authorized users of the first group, wherein the database attribute is modified by the proposed value stored in the modification attribute value only if a quorum is reached and all of the mandatory authorizers have accepted the proposed value before the end time is reached.

16. The computer database of claim 15 wherein a read access right with regard to the database attribute is granted to each authorized user in the list of owners.

17. The computer database of claim 15 wherein each of the authorized users in the list of owners is granted a right to initiate a request to modify the database attribute if there is no request for modifying the database attribute outstanding.

18. A method for implementing a quorum based access control mechanism for modifying a database attribute, the method comprising:

defining a minimum number of authorized users needed to form a quorum;

notifying the authorized users of a modification request to modify the database attribute;

determining whether each authorized user that responds to the request approves or denies the request;

determining if a quorum exists, wherein the quorum exists only if the number of responses approving the modification request is equal to or greater than the defined minimum number of authorized users; and modifying the database attribute only if a quorum exists.

19. The method of claim 18 further comprising:

identifying at least one user as a mandatory authorizer;

determining if the at least one mandatory user has approved or denied the modification request; and determining if a quorum exists only if the at least one mandatory user has approved the modification request.

20. The method of claim 19 wherein the defined number of authorized users is equal to the number of mandatory authorizers, and wherein determining if the at least one mandatory user has approved the modification request also determines whether a quorum exists.

21. The method of claim 18 further comprising:

defining a request start time and a request end time; and terminating the modification request upon reaching the request end time.

22. The method of claim 18 further comprising:

updating an authorization status table with the response of each authorized user who has responded; and checking the authorization status table when determining if a quorum exists.

23. The method of claim 18 further comprising enabling only an authorized user to submit the modification request.

24. A computer readable medium for storing computer executable instructions for modifying a database attribute using a quorum based access control mechanism, the instructions including:

instructions for receiving a modification request to modify the database attribute;

instructions for notifying one or more authorized users of the modification request to modify a database attribute;

instructions for checking an authorization status table containing responses to the modification request from the authorized users, wherein each response either approves or rejects the modification request;

instructions for determining if the authorization status table contains at least a predefined number of responses approving the modification request; and instructions for modifying the database attribute if there are at least the predefined number of responses approving the modification request.

25. The computer readable medium of claim 24 further comprising:

instructions for determining if a mandatory user has submitted a response denying the modification request; and instructions for rejecting the modification request if the mandatory user has denied the modification request.

26. The computer readable medium of claim 24 further comprising instructions for determining if each mandatory user has submitted a response approving the modification request; and instructions for determining if a quorum has been reached only if all mandatory users have approved the modification request.

27. A method for implementing an access control mechanism for modifying a database attribute, the method comprising:

identifying a threshold number of authorized users needed to approve a request to modify the database attribute;

notifying the authorized users of the request;

receiving at least one response to the request from at least one authorized user;

counting a number of responses approving the request; and modifying the database attribute only if the number of responses approving the request meets the identified threshold number.

28. The method of claim 27 further comprising:

identifying at least one authorized user as a mandatory user;

determining if the mandatory user has approved the request; and modifying the database attribute only if the mandatory user has approved the modification request.

* * * * *

UNITED STATES PATENT AND TRADEMARK OFFICE
CERTIFICATE OF CORRECTION

PATENT NO. : 6,775,668 B1
DATED : August 10, 2004
INVENTOR(S) : Goel

It is certified that error appears in the above-identified patent and that said Letters Patent is hereby corrected as shown below:

Column 7,
Line 17, replace the word "redefined" with -- predefined --.
Line 31, please replace "met hod" with -- method --.

Signed and Sealed this

Nineteenth Day of October, 2004

JON W. DUDAS
*Director of the United States Patent and Trademark Office*